(12) United States Patent
Tang

(10) Patent No.: US 7,715,190 B2
(45) Date of Patent: May 11, 2010

(54) ELECTRONIC DEVICE WITH SUPPORT LEGS

(75) Inventor: Zi-Ming Tang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 4 days.

(21) Appl. No.: 12/180,557

(22) Filed: Jul. 27, 2008

(65) Prior Publication Data

US 2009/0279237 A1 Nov. 12, 2009

(30) Foreign Application Priority Data

May 6, 2008 (CN) .................. 2008 1 0301435

(51) Int. Cl.
*H05K 5/00* (2006.01)
*H05K 7/00* (2006.01)

(52) U.S. Cl. .................. 361/679.55; 361/679.56; 361/679.59

(58) Field of Classification Search .......... 361/679.55, 361/679.59, 679.56
See application file for complete search history.

(56) References Cited

U.S. PATENT DOCUMENTS

| 5,297,003 A * | 3/1994 | Nomura et al. ........ 361/679.12 |
| 6,081,420 A * | 6/2000 | Kim et al. ............ 361/679.22 |
| 6,498,719 B1 * | 12/2002 | Bridges ............... 361/679.34 |
| 7,542,276 B2 * | 6/2009 | Chang ................. 361/679.59 |
| 7,566,043 B2 * | 7/2009 | Chen .................. 248/616 |

* cited by examiner

*Primary Examiner*—Jayprakash N Gandhi
*Assistant Examiner*—Anthony M Haughton
(74) *Attorney, Agent, or Firm*—Zhigang Ma

(57) ABSTRACT

An exemplary electronic device (30) includes a main body (40) and two support leg (60). The main body has two guiding rails (413). The guiding rails are formed at two adjacent corners of the main body correspondingly. Each support leg is slidably disposed at one corresponding guiding rail so that the main body aslant supported.

11 Claims, 6 Drawing Sheets

ELECTRONIC DEVICE WITH SUPPORT LEGS

BACKGROUND OF THE INVENTION

1. Field of the Invention

The present invention generally relates to electronic devices, particularly to an electronic device with a main body and a rotatable display body.

2. Discussion of the Related Art

A notebook computer mainly includes a main body with a keyboard and a display body. The display body is rotatably attached to the main body in order that the display body can be opened and closed relative to the main body. In use, the main body is disposed on a flat tabletop of a table. However, an angle between the main body and the flat tabletop is 0 degree. Thereby, the keyboard is not comfortable for a user to operate, and the user easily feel tired after long hours of using the notebook. In addition, when the notebook computer is laid on the table, the main body of the notebook computer touches the flat tabletop fully. Therefore, the heat produced by internal electronic components cannot be dispersed efficiently from the main body of the notebook, even though the notebook has a fan for heat dissipation. As a result, the internal electronic components may be damaged due to overheating. Accordingly, a notebook computer which can solve the above-described problems is needed.

Referring to FIG. 6, a typical notebook computer 10 includes a main body 11 and a display body 12. The main body 11 defines a first groove 113 for receiving a keyboard 112. One end of the keyboard 112 is rotatably connected to a sidewall defining the first groove 113. A bottom wall defining the first groove 113 further defines a second groove 115 for receiving an elastic member 114. One end of the elastic member 114 is rotatably connected to a sidewall of the second groove 115. In use, the keyboard 112 is rotated through a desired angle relative to the main body 11, and is supported by the elastic member 114. Therefore, the keyboard 112 is slanted relative to the main body 11. As a result, a user will feel comfortable to operate on the keyboard 112. Furthermore, a gap for emitting heat is formed between the keyboard 112 and the main body 11.

However, dust could get into the inside of the main body 11 via the gap between the keyboard 112 and the main body 11, and deposits on the internal electronic components of the main body 11. Therefore, a short circuit of the internal electronic components may occur, and the heat produced by the internal electronic components is not easy to disperse from inside thereof.

Therefore, an electronic device which overcomes the above-described shortcomings is desired.

SUMMARY

An exemplary electronic device includes a main body and two support legs. The main body has two guiding rails. The guiding rails are formed at two adjacent corners of the main body correspondingly. Each support leg is slidably disposed at one corresponding guiding rail so that the main body aslant supported.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the electronic device. Moreover, in the drawings, like reference numerals designate corresponding parts throughout the several views.

DETAILED DESCRIPTION OF THE EMBODIMENTS

References will now be made to the drawings to describe embodiments of the present electronic device, in detail.

Figure 1:
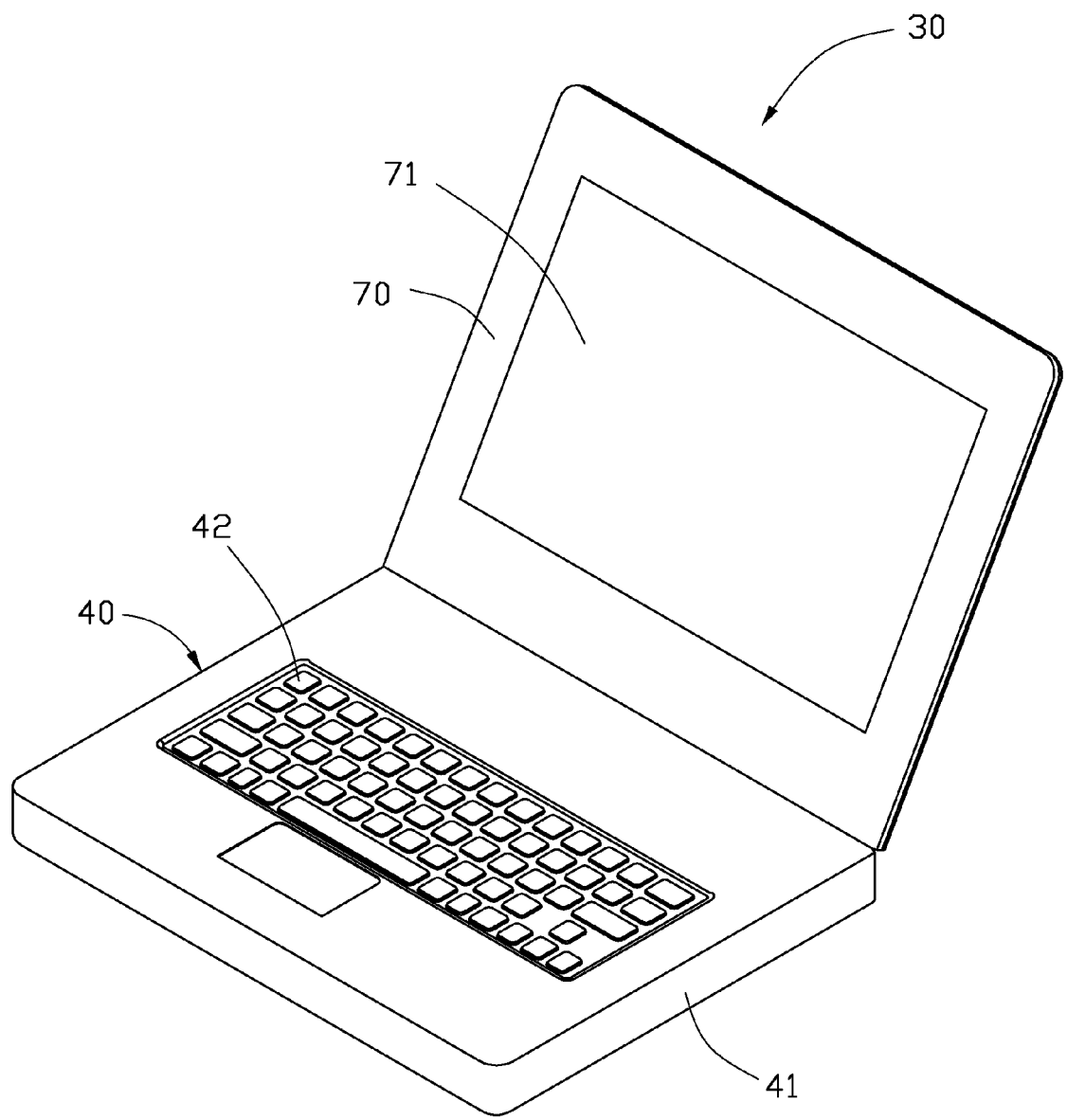
FIG. 1 is an isometric view of a notebook computer in accordance with a first embodiment of the present invention.
Figure 2:
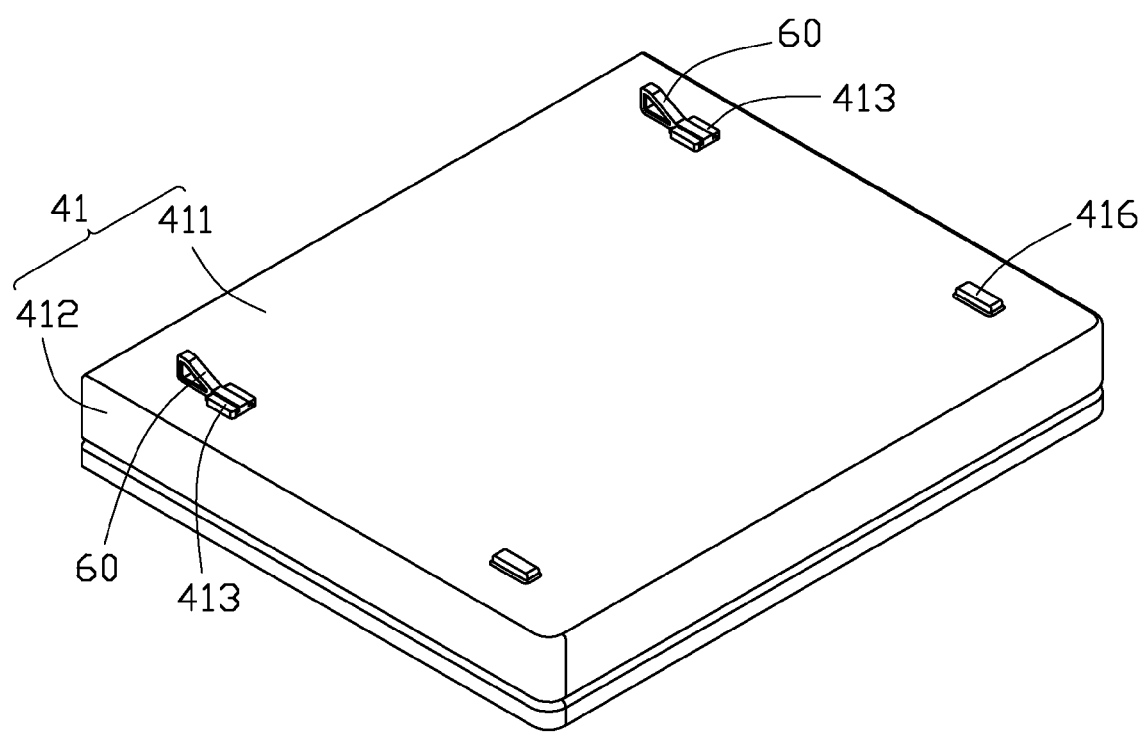
FIG. 2 is an isometric view of the notebook computer of FIG. 1 in a closed state, and viewed from a bottom-side up aspect.

Referring to FIGS. 1 and 2, a notebook computer 30 in accordance with a first embodiment of the present invention is shown. The notebook computer 30 includes a main body 40, a display body 70, and two removable support legs 60. The display body 70 is rotatably connected to one side of the main body 40. The main body 40 includes a housing 41, a keyboard 42, and a plurality of electronic components (not shown). The keyboard 42 is assembled on the top of the housing 41. The electronic components are disposed in the housing 41 and under the keyboard 42. The display body 70 includes a display panel 71.

Figure 3:
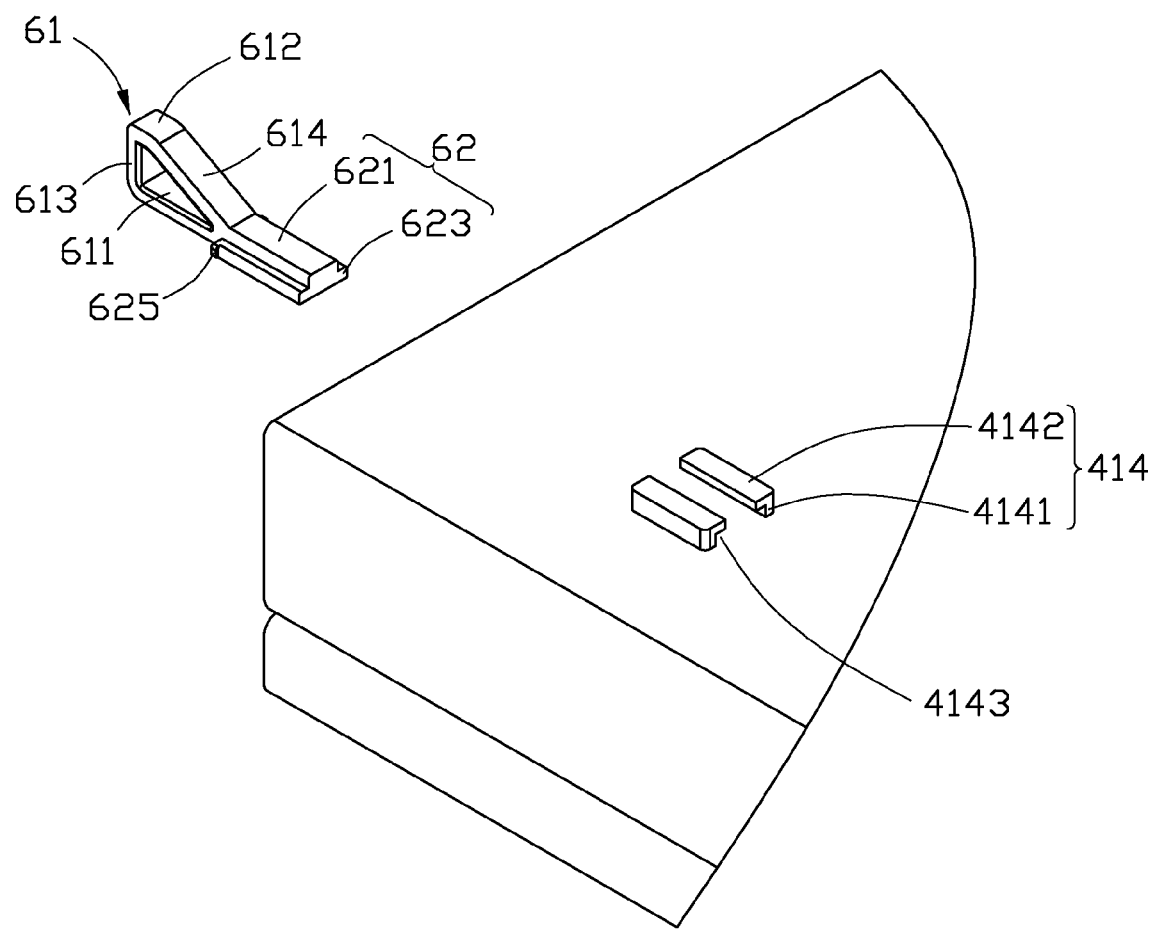
FIG. 3 is a partially exploded, isometric view of the notebook computer of FIG. 2.

Referring to FIGS. 2 and 3, the housing 41 includes a rectangular base plate 411 and four side plates 412. The side plates 412 substantially extend perpendicularly from an edge of the base plate 411. Two guiding rails 413 are formed at two corners of the base plate 411 adjacent to a joint of the housing 41 and the display body 70. In this embodiment, the guiding rail 413 includes two opposite limiting members 414. The limiting member 414 includes a side plate 4141 and a flange 4142. The side plates 4141 perpendicularly extend form the base plate 411. The flanges 4142 perpendicularly extend from an end of the side plates 4141 away from the base plate 411. The limiting members 414 and the base plate 411 cooperatively define a guiding groove 4143. Two pads 416 are formed at another two corners of the base plate 411 correspondingly. The pads 416 have a same height as the guiding rails 413.

Referring to FIG. 3, each of the removable support legs 60 includes a main portion 61 and a sliding portion 62 extending from an end of the main portion 61. The main portion 61 includes a bottom plate 611, a top plate 612, a first side plate 613, and a second side plate 614. The bottom plate 611 is parallel to the top plate 612. The first side plate 613 connects the bottom plate 611 with the top plate 612. The second side plate 614 also connects the bottom plate 611 with the top plate 612. That is, the main portion 61 is wedge-shaped. The sliding portion 62 includes a base 621 and two sliding bars 623 extending from opposite sides of the base 621. The sliding portion 62 is configured for engaging in the guiding groove 4143 of the guiding rail 413. A protrusion 625 is formed at an end of each sliding bar adjacent to the main portion 61, thus preventing the support leg 60 from leaving the guiding rail 413.

Figure 4:
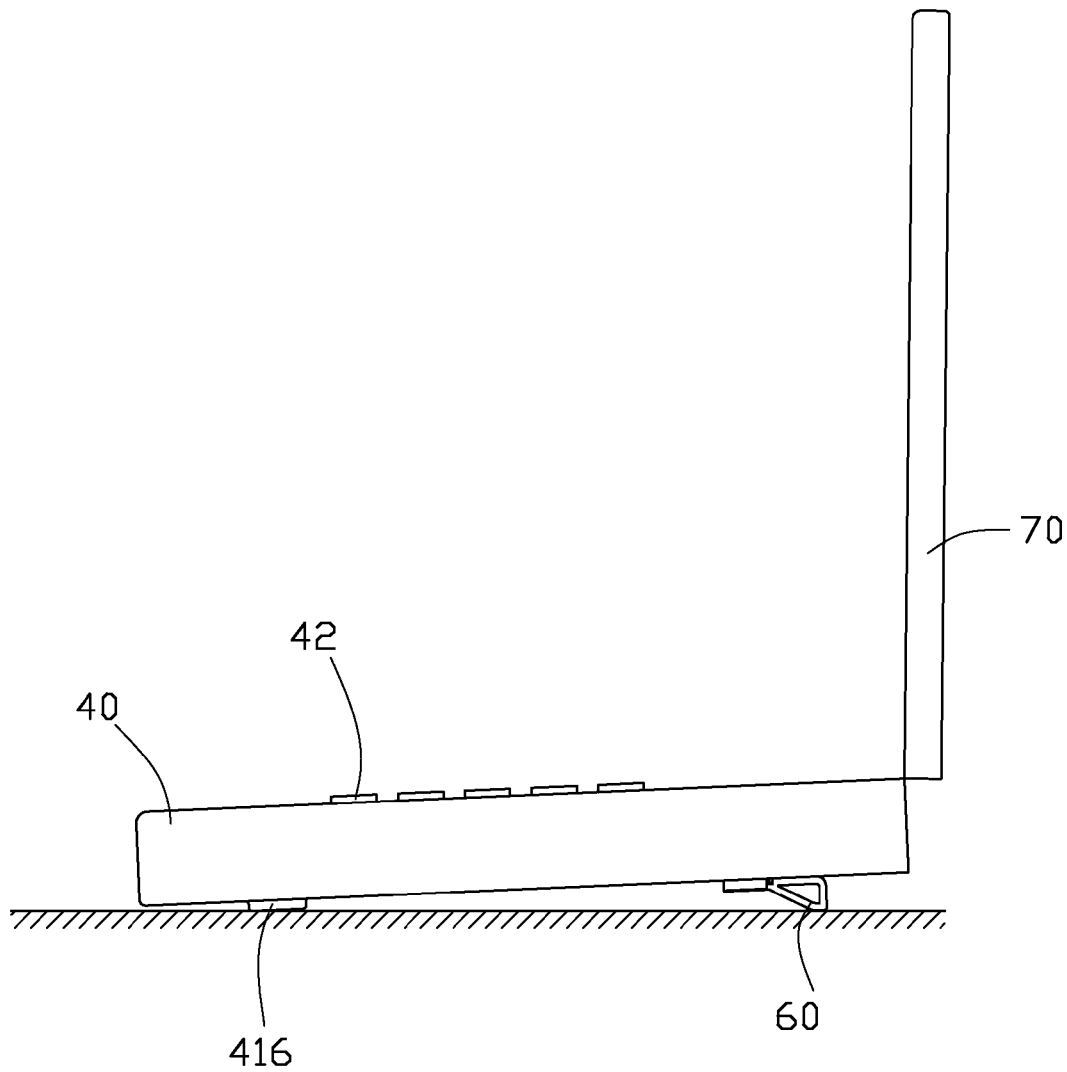
FIG. 4 is a side view of the notebook computer supported by the support legs of FIG. 2.

Referring to FIGS. 2 through 4, in use, each of the sliding portions 62 of the support legs 60 is inserted into one of the guiding rails 413 respectively. As such, the main body 40 is supported by the support leg 60, thus the main body 40 is tilted above a top of a flat surface such as a table. The support leg 60 can be driven to slide along the guiding rail 413, in order to adjust a gradient of the main body 40 relative to the tabletop. When the notebook computer 30 does not need to be supported by the support legs 60, the support legs 60 can be removed form the guiding rails 413. As a result, the notebook computer 30 is only supported by the guiding rails 413 and pads 416.

Because the notebook computer 30 tilted away from the tabletop of the table via the help of the support legs 60, operating the keyboard 42 of the main body 40 would be more comfortable. Furthermore, heat can be dispersed from a bottom of the main body 40, thus making the heat produced by the electronic components dispersed more efficiently. The electronic components are sealed between the housing 41 and keyboard 42, in order to isolate the electronic components.

It should be understood that, the guiding rails 413 can also be two grooves defined in the housing 41, and the sliding portions 62 of the support legs 60 are slidably received in the grooves of the housing 41. The notebook computer 30 may include one single support leg 60. In that case, the support leg 60 is preferred to be disposed on the middle of one side of the main body 40. In addition, the notebook computer 30 can include three or more support leg 60. Furthermore, a limiting protrusion can be formed adjacent one end of one of the guiding rails 413, in order to define a largest sliding distance for the support legs 60.

Figure 5:
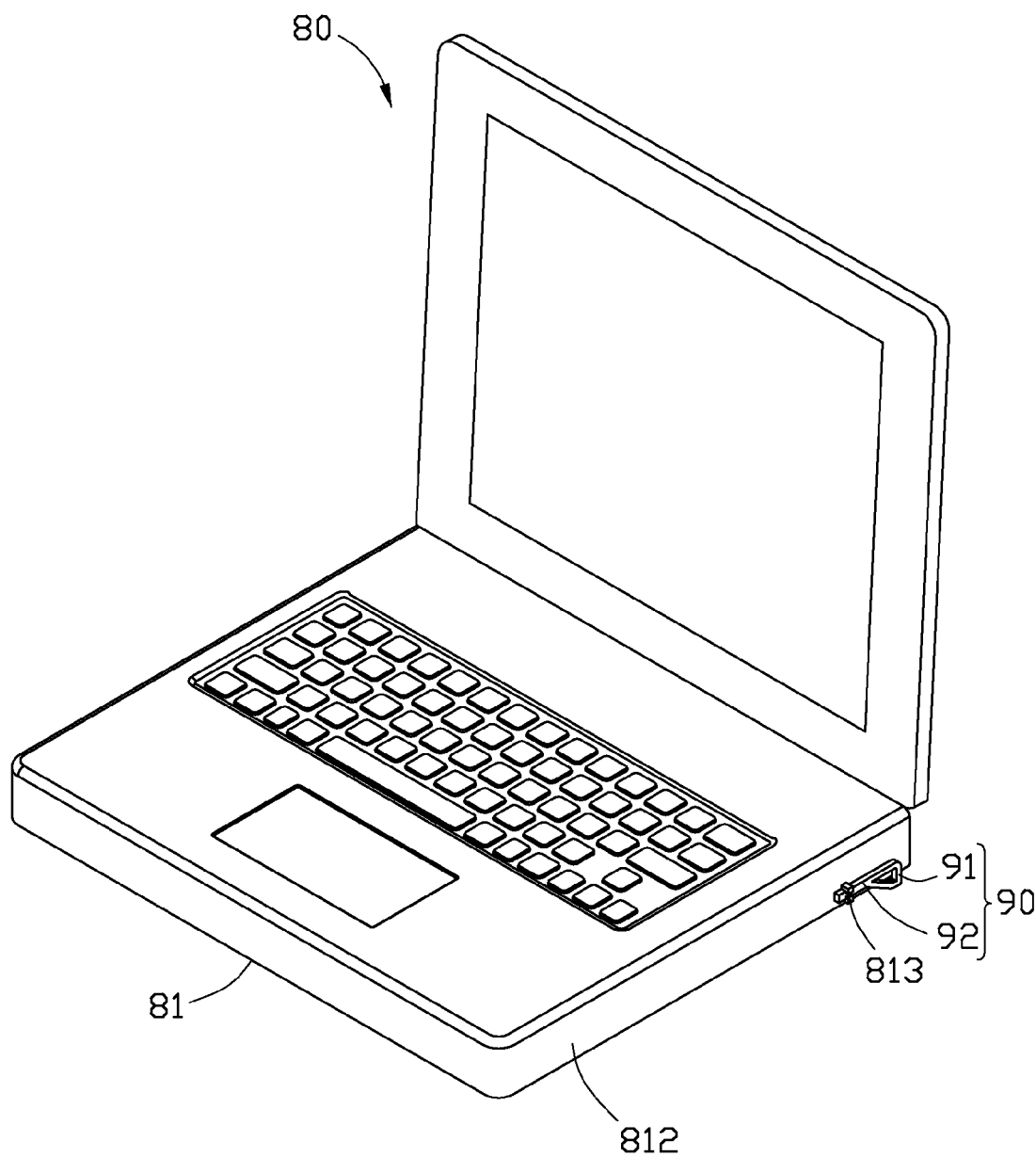
FIG. 5 is an isometric view of a notebook computer in accordance with a second embodiment of the present invention.
Figure 6:
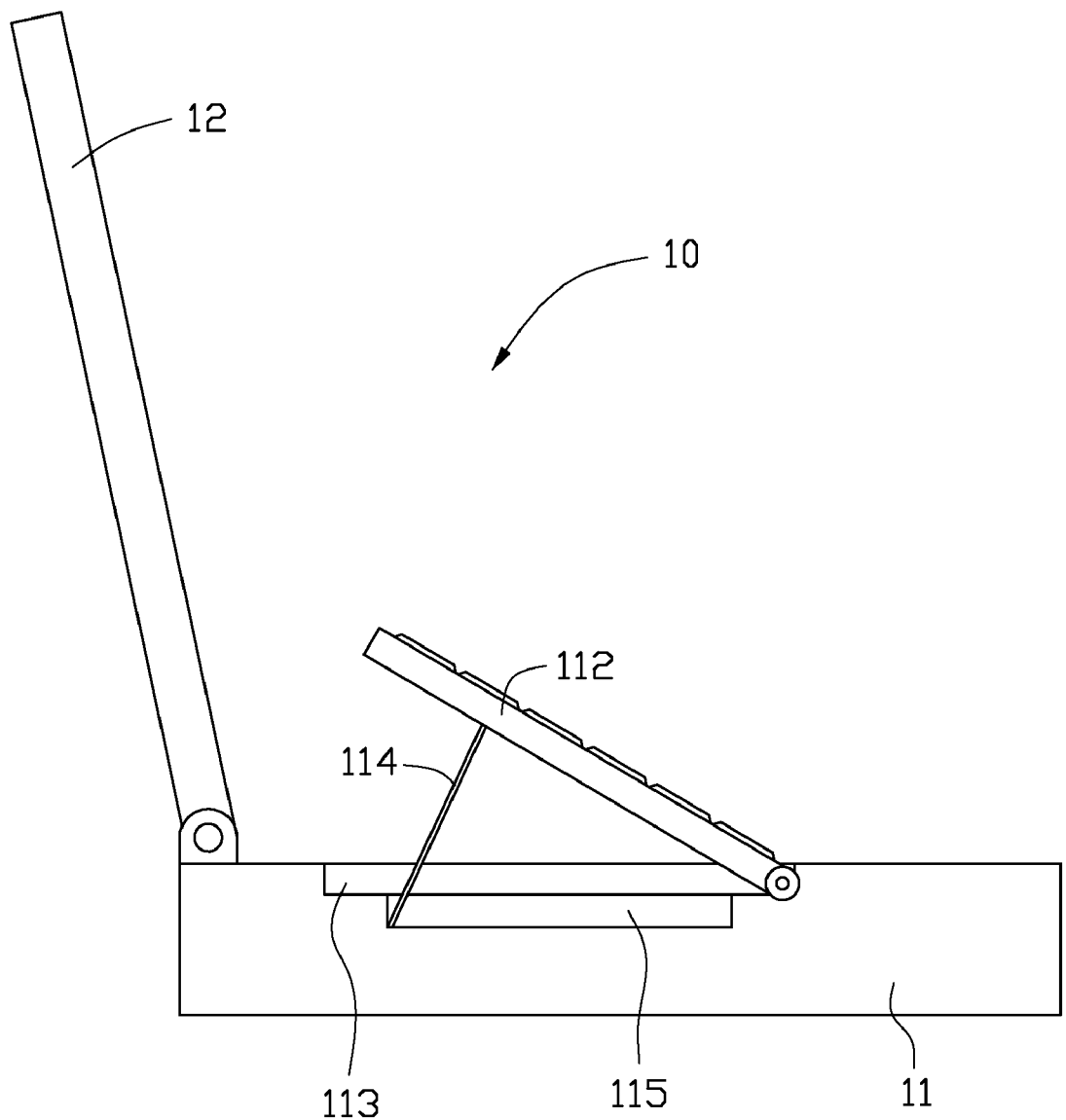
FIG. 6 is a side view of a conventional notebook computer.

Referring to FIG. 5, a notebook computer 80 in accordance with a second embodiment of the present invention is shown. The notebook computer 80 is similar in principle to the notebook computer 30 of the first embodiment, however two guiding rails 813 are formed at two opposite side plates 812 of a main body 81 correspondingly. The notebook computer 80 includes two support legs 90. Each support leg 90 includes a main portion 91 and a sliding portion 92 extending from an end of the main portion 91. In use, the sliding portions 92 of the support legs 90 are inserted into the guiding rails 813. Then, the notebook computer 80 is supported by the support legs 90, thereby being slanted to a tabletop of a table. When the notebook computer 80 does not need to be supported by the support legs 90, the support legs 90 are pulled out from the guiding rails 813. After that, the support legs 90 can be flipped around 180 degrees, and inserted into the guiding rail 813 again with the main portion 91 of the support leg 90 away from a bottom surface of the main body 81.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An electronic device, comprising:
a main body having at least one guiding rail; and
at least one support leg, each of which is capable of being slidably engaged with one of the at least one guiding rail, in order to make the main body aslant supported,
wherein each of the at least one support leg comprises a main portion and a sliding portion extending from an end of the main portion, the sliding portion comprising a base and two sliding bars extending from opposite sides of the base, and a protrusion is formed at an end of each sliding bar adjacent to the main portion.

2. The electronic device as claimed in claim 1, wherein the main body further comprises a housing, the housing comprises a base plate and a plurality of side plates, the side plates are substantially perpendicularly extending from the edge of the base plate.

3. The electronic device as claimed in claim 2, wherein the number of the at least one guiding rail is two, the guiding rails are formed at two adjacent corners of the main body respectively.

4. The electronic device as claimed in claim 2, wherein the number of the at least one guiding rail is two, the guiding rails are formed at opposite side plates of the housing respectively, thus making the main body aslant supported.

5. The electronic device as claimed in claim 1, wherein the main portion of each of the at least one support leg is wedge-shaped, the main portion comprises a bottom plate, a top plate, and two side plates, the bottom plate is parallel to the top plate, the side plates connect the bottom plate to the top plate respectively.

6. The electronic device as claimed in claim 2, wherein each of the at least one guiding rail comprises two opposite limiting members.

7. The electronic device as claimed in claim 6, wherein each limiting member of each of the at least one guiding rail comprises a side plate and a flange, the side plate is perpendicularly extending from the base plate, and the flange is perpendicularly extending from a side of the side plate away from the base plate.

8. The electronic device as claimed in claim 1 being a notebook computer.

9. The electronic device as claimed in claim 1, further comprising a display body, the display body is rotatably connected to the main body.

10. The electronic device as claimed in claim 2, further comprising a keyboard, the keyboard is disposed on the top of the housing.

11. The electronic device as claimed in claim 2, wherein the main body further comprises two pads formed at opposite sides of the base plate.

* * * * *